(12) United States Patent
Morris et al.

(10) Patent No.: US 8,495,005 B2
(45) Date of Patent: Jul. 23, 2013

(54) METHODS FOR MATCHING METADATA FROM DISPARATE DATA SOURCES

(75) Inventors: Richard K. Morris, Buckinghamshire (GB); Neville T. Myatt, Buckinghamshire (GB)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 12/353,601

(22) Filed: Jan. 14, 2009

(65) Prior Publication Data

US 2010/0185637 A1  Jul. 22, 2010

(51) Int. Cl.
*G06F 7/00* (2006.01)
*G06F 17/00* (2006.01)
*G06F 17/30* (2006.01)

(52) U.S. Cl.
USPC ............................ 707/602; 707/723; 707/809

(58) Field of Classification Search
USPC ................................. 707/602, 603, 723, 809
See application file for complete search history.

(56) References Cited

U.S. PATENT DOCUMENTS

| | | | | |
|---|---|---|---|---|
| 4,751,702 | A * | 6/1988 | Beier et al. ....................... | 714/13 |
| 6,836,777 | B2 * | 12/2004 | Holle ..................................... | 1/1 |
| 7,254,587 | B2 | 8/2007 | Lee et al. | |
| 2005/0091251 | A1 * | 4/2005 | Ramarao ....................... | 707/101 |
| 2007/0005543 | A1 * | 1/2007 | Furst et al. ...................... | 706/47 |
| 2007/0136330 | A1 * | 6/2007 | Lecheler-Moore et al. .. | 707/100 |
| 2007/0239769 | A1 * | 10/2007 | Fazal et al. ..................... | 707/102 |
| 2008/0021912 | A1 * | 1/2008 | Seligman et al. ............. | 707/101 |

OTHER PUBLICATIONS

"A Metadata-Based Generic Matching Framework for Web Ontologies", Mochol et al., (Jun. 30, 2005) Freie Universitat Berlin, Tech. Report B-05-08. 28 pp.
"The Flexlab Approach to Realistic Evaluation of Networked Systems", Friedrich, J.R., (Apr. 2007) NSDI 2007, ACM New York, NY, 14 pp.
"Design and implementation of standard ETL tool based on CWAM", Hong-yuan et al., Source: http://www.engineeringvillage. com/controller/servlet/
Controller?SEARCHID=d8a1a011aca960bf6M3d0prod1data1
&CID_expertSearchAbstractFormat&DOCINDEX=3
&format=expertSearchAbstractFormat.
"Business Objects Data Migration Solution", © 2007 Business Objects, Part #WS496-A, 3pp.

* cited by examiner

*Primary Examiner* — James E Richardson
(74) *Attorney, Agent, or Firm* — Kali Law Group, P.C.

(57) ABSTRACT

Methods for matching a candidates with a target utilizing extract, transform and load (ETL) metadata utilizing a computer, the candidates originating from a number of secondary data sources are presented including: causing the computer to receive the target from a target data source; causing the computer to fetch the candidates from the number of secondary data sources; causing the computer to process match rules, the match rules configured for determining whether the candidates match with the target, where the ETL metadata provides data for the processing; if the number of match rules determines a potential candidate match, causing the computer to score the potential candidate match utilizing a weighting method, the weighting method corresponding with a degree of importance of the match, where the potential candidate match corresponds with one of candidates; and causing the computer to display the potential candidate match.

19 Claims, 3 Drawing Sheets

METHODS FOR MATCHING METADATA FROM DISPARATE DATA SOURCES

BACKGROUND

Information continues to accumulate in electronic data space as data acquisition techniques improve and become more pervasive. Indeed, data acquisition systems are so ubiquitous, that similar or substantially similar data may be collected many times over across a particular demographic segment. For example, in retail sales, data acquired from a customer may be entered at any number of retail outlets from which the customer wishes to receive mailings, announcements, or advertising materials. In each of the retail outlets, the customer may enter similar or substantially similar data. Each retail outlet, in turn, may utilize a unique data acquisition system for gathering data. As may be appreciated, in combining data from each data acquisition system into a single system may result in duplicative entries, which may ultimately adversely affect data handling performance.

In one example, in the extract, transform, and load (ETL) space, data is extracted from a data source, transformed in accordance with a desired business objective, and loaded into a data warehouse. Most data warehousing projects consolidate data from different sources. Typically, during extraction, data integrity is checked against an expected pattern or structure. If the pattern or structure does not match, the data may be rejected. Unfortunately, beyond routine data integrity checks, many data acquisition systems are not configured for identifying duplicative data upon extraction. It may be appreciated that removing duplicative data before loading into a data warehouse may achieve some processing efficiencies.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for matching a candidates with a target utilizing extract, transform and load (ETL) metadata utilizing a computer, the candidates originating from a number of secondary data sources are presented including: causing the computer to receive the target from a target data source; causing the computer to fetch the candidates from the number of secondary data sources; causing the computer to process match rules, the match rules configured for determining whether the candidates match with the target, where the ETL metadata provides data for the processing; if the number of match rules determines a potential candidate match, causing the computer to score the potential candidate match utilizing a weighting method, the weighting method corresponding with a degree of importance of the match, where the potential candidate match corresponds with one of candidates; and causing the computer to display the potential candidate match. In some embodiments, methods further include: causing the computer to select the potential candidate match for inclusion with the target data source, where the potential candidate match is at least partially appended to the target. In some embodiments, the scoring is based on a weighting method such as a user defined weighting method, and a heuristically defined weighting method.

In other embodiments, a computer program products for matching candidates objects with a target utilizing extract, transform and load (ETL) metadata, the candidates originating from secondary data sources are presented including: a computer readable medium; program instructions for receiving the target from a target data source; program instructions for fetching the number of candidates from the secondary data sources; program instructions for processing match rules, the match rules configured for determining whether the candidates match with the target, where the ETL metadata provides data for the processing; if one of the match rules determines a match, program instructions for scoring the potential candidate match utilizing a weighting method, the weighting method corresponding with a degree of importance of the match, where the potential candidate match corresponds with one of the candidates; and program instructions for displaying the match.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
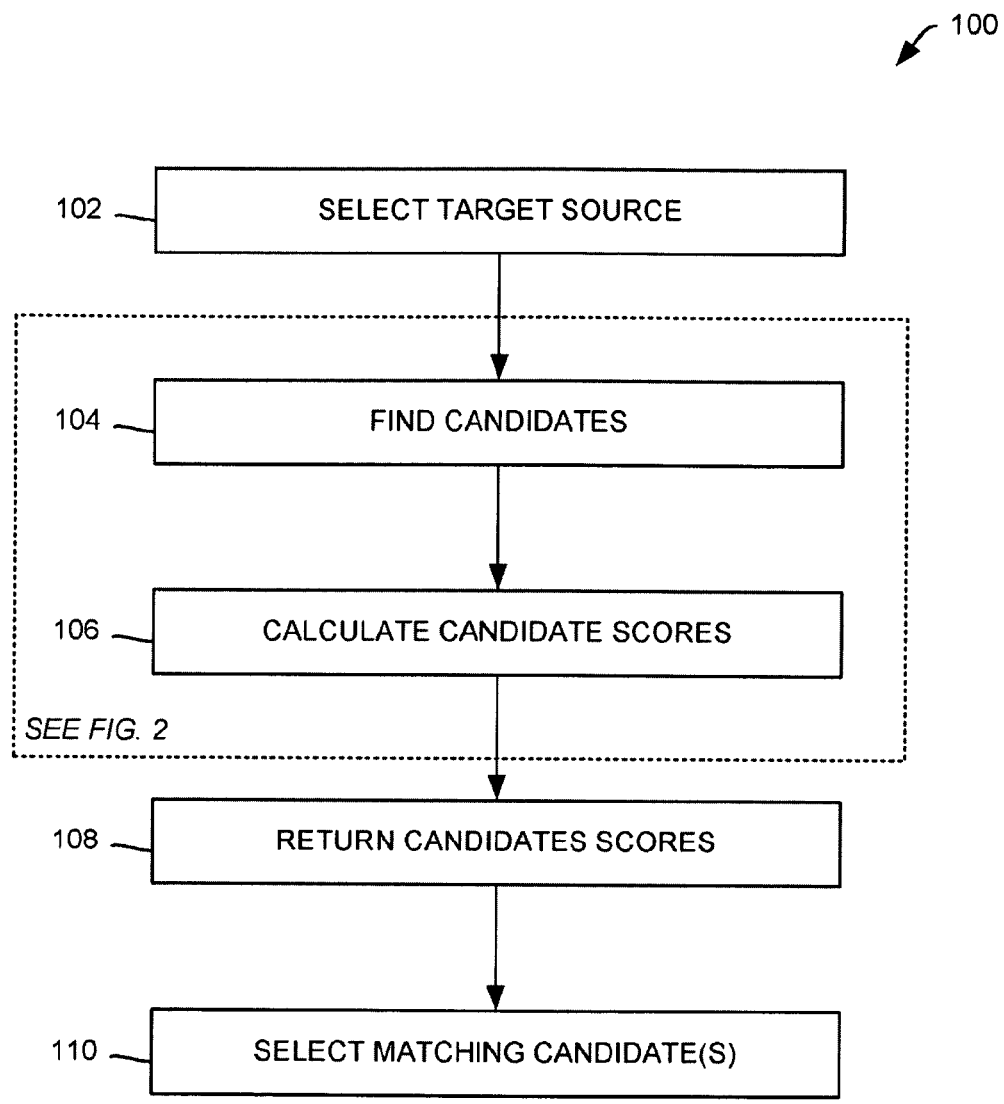
FIG. 1 is an illustrative overview flowchart of methods for matching a target with candidates in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In general, determining whether source data and target data match is not generally a matter of simple equality or match identities. At least one reason for this is that what is considered "matching data" may have varying degrees of "sameness." In other words, although source data and target data may have differences, those differences may not be enough to distinguish one from the other. Thus, when comparing data, at least some interpretation of the data may be required to determine a match. In some embodiments, a best guess weighted match may be utilized to determine a match.

FIG. 1 is an illustrative overview flowchart 100 of methods for matching a target with candidates in accordance with embodiments of the present invention. At a first step 102, the method selects a target source. A target source is data that provides a source for comparison with a candidate. In some embodiments a target source includes ETL metadata. In some embodiments, a target source is an object; however any data or representation of data may be utilized without departing from the present invention. For purposes of this discussion, the term "table data" will be utilized to refer to ETL metadata or any other data or representation of data for use in comparing a target source and a candidate. In addition, target sources may originate from any number of data sources including without limitation and without departing from the present invention: relational databases, non-relational databases, flat files, Relational Database Management System (RDBMS), Information Management System (IMS), Virtual Storage Access Method (VSAM), Indexed Sequential Access Method (ISAM), ORACLE™ database, and DB2 database. At a next step 104, the method finds candidates. In embodiments, a candidate is compared with a target source. Any number of candidates may be found depending on selection criteria. In some embodiments a candidate includes ETL metadata. In some embodiments, a candidate is an object; however any data or representation of data may be utilized without departing from the present invention. In some embodiments, ETL metadata may be utilized for matching target sources and candidates. In addition, candidates may originate from any number of data sources including without limitation and without departing from the present invention: relational databases, non-relational databases, flat files, Relational Database Management System (RDBMS), Information Management System (IMS), Virtual Storage Access Method (VSAM), Indexed Sequential Access Method (ISAM), ORACLE™ database, and DB2 database. At a next step 106, the method calculates candidate scores as a result of processing match rules, which will be discussed in further detail below for FIG. 2.

At a next step 108, the method returns candidate scores. Candidate scores may, in some embodiments, be presented in tables or in suitable visualizations in order to provide a user with the greatest flexibility in identifying suitable matches. In some embodiments, scoring is made in accordance with user defined weighting methods, or a heuristically defined weighting method. At a next step 110, the method selects matching candidates. In some embodiments, selection is user-defined. In other embodiments, selection is automated in accordance with candidate scores. In some embodiments, selection is made in accordance with pre-defined constraints. In some embodiments, selected candidates may be selected for inclusion (in the case of a match) with or exclusion (in the case of a non-match) from a data source. In some embodiments, matching candidates may be further examined to determine whether desired attributes in a candidate may be appended to a target source.

Figure 2:
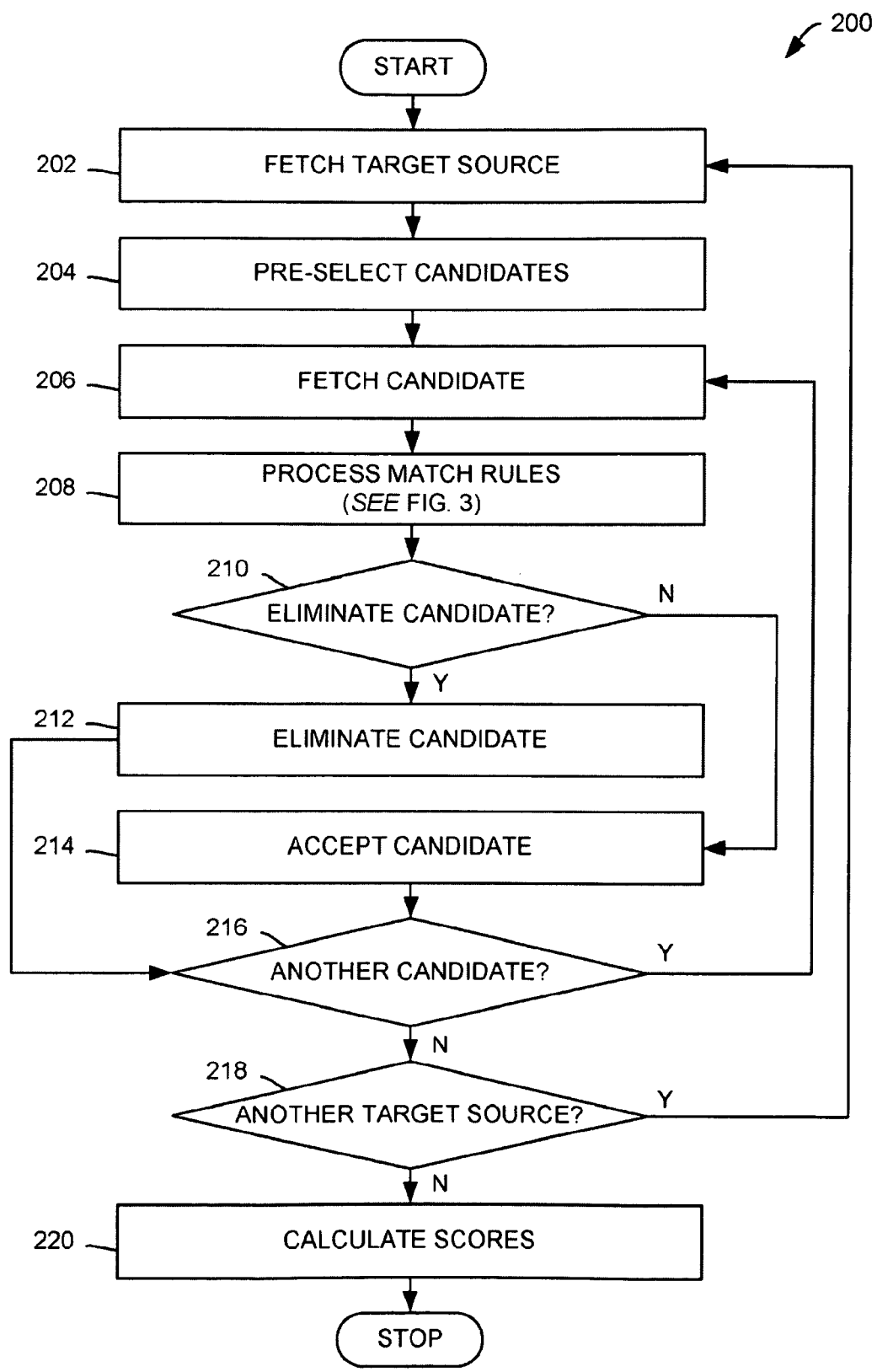
FIG. 2 is an illustrative flowchart of methods for selecting candidates in accordance with embodiments of the present invention.

FIG. 2 is an illustrative flowchart 200 of methods for selecting candidates in accordance with embodiments of the present invention. In particular, flowchart 200 is at least partially representative of steps 104 to 106 in FIG. 1 above. At a first step 202, method fetches a target source that was previously selected (see 102, FIG. 1). As noted above, a target source is data that provides a source for comparison. In some embodiments a target source includes ETL metadata. In some embodiments, a target source is an object; however any data or representation of data may be utilized without departing from the present invention. At a next step 204, the method pre-selects candidates. As noted above, in embodiments, a candidate is compared with a target source to determine whether a match exists. Any number of candidates may be pre-selected depending on selection criteria, which criteria may be input by a user or automated according to pre-selection criteria. In some embodiments a candidate includes ETL metadata. In some embodiments, a candidate is an object; however any data or representation of data may be utilized without departing from the present invention. At a next step 206, the method fetches a candidate from the pre-selected candidates for comparison with the target source. Fetched candidates may be sorted in any manner known in the art without departing from the present invention.

At a next step 208, the method processes match rules. In general, matching is performed using an ordered set of match rules, each of which can either add to a candidate's score or eliminate a candidate from further processing. In some embodiments, weighted scores are additive producing a total for each candidate where the highest score represents a "best match." In some embodiments, table data may be utilized for processing match rules. In embodiments, match rules do not require that table data between a target source and a candidate must be structurally the same (i.e. target attributes do not necessarily need to be precisely the same as candidate attributes), but that match rule processing must be able to derive at least some equivalent semantics from the attributes in order to attain a match. In some embodiments, match rules may operate to perform semantic matching. Thus, in one example, match rules may compare a target attribute with a portion of a candidate attribute or even multiple combined-attributes utilizing fuzzy match techniques. In another example embodiment, match rules may include a case-independent match or partial match of strings. In still other embodiments, match rules may include without limitation: a table identity match comparison, a data domain match comparison, a column match comparison, a primary key match comparison, a foreign key match comparison, and a semantic match.

Match rules may be configured to perform at least two functions: elimination and scoring. Thus, for example, candidates whose names do not partially match a target may be eliminated. In addition, scoring may be applied to any remaining candidate where the highest score indicates a best match between target and candidate. In some embodiments, match rule scoring may include weighting. Thus, processing a match rule may produce a raw score which may then be adjusted by a predetermined weighting. In some embodiments, weightings may be heuristically defined, statically pre-defined, or user defined. In a heuristically defined embodiment, an adaptive system may be configured to discover patterns in a user's final selection of candidates as offered by the table data match rules and to re-align future default selections in accordance with discovered patterns. Heuristic training, in this example selection process, could be viewed as an application of optimization theory and/or statistical estimation without departing from the present invention. Heuristic training, in some embodiments may be hidden to a user, with re-alignments of default selections made only where sufficient historical data is available for a given candidates scoring. In addition, match rules may be selected or de-selected in an ad hoc manner as desired by a user. Some processing efficiencies may be derived by de-selecting match rules which are clearly not relevant to a current data set. Processing match rules will be described in further detail below for FIG. 3.

At a next step 210, the method determines whether to eliminate a candidate. Eliminating a candidate represents a first pass at filtering pre-selected candidates. Thus, if the method determines at a step 210 to eliminate the candidate, the candidate is eliminated at a step 212, whereupon the method continues to a step 216. If the method determines at a step 210 to not eliminate the candidate, the candidate is accepted as a potential candidate match at a step 214, whereupon the method continues to a step 216. At a next step 216, the method determines whether there are additional candidates available for comparison. If the method determines at a step 216 that additional candidates are available, the method continues to a step 206 to fetch an available candidate. If the method determines at a step 216 that there are no additional candidates available for comparison, the method continues to a step 218 to determine whether additional target sources are available for comparison. If the method determines at a step 218 that additional target sources are available for comparison, the method continues to a step 202 to fetch an available target source. If the method determines at a step 218 that additional target sources are not available for comparison, the method continues to a step 220 to calculate scores of accepted candidates, whereupon the method ends. Calculating scores, as noted above, may include utilizing weighting scores in accordance with heuristically defined, statically pre-defined, or user defined parameters.

Figure 3:
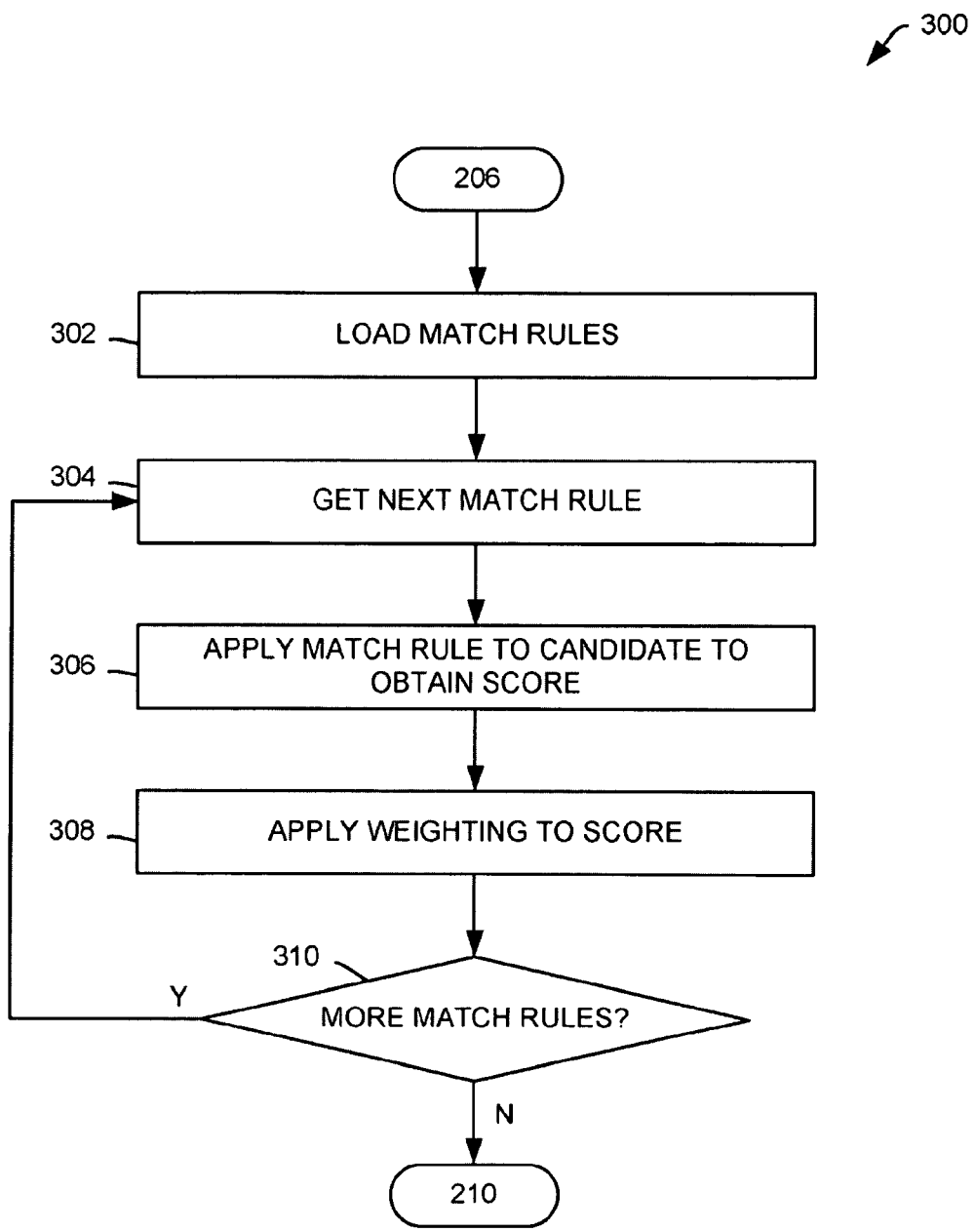
FIG. 3 is an illustrative flowchart of methods for processing match rules in accordance with embodiments of the present invention.

FIG. 3 is an illustrative flowchart 300 of methods for processing match rules in accordance with embodiments of the present invention. In particular, flowchart 300 further describes a step 208 (FIG. 2). At a first step 302, the method loads match rules. Match rules may be loaded in any order without departing from the present invention. Additionally, as noted above, match rules may be selected or deselected as necessary or as desired. Thus, rules may be static or dynamic depending on a user's needs. At a next step 304, the method gets a next match rule. In embodiments, match rules may include without limitation: a table identity match comparison, a data domain match comparison, a column match comparison, a primary key match comparison, a foreign key match comparison, a semantic match comparison, a case independent match comparison, a partial string match comparison, and a fuzzy match comparison.

At a next step 306, the method applies the match rule to a candidate to obtain a raw score. A raw score may produce any number of quantifying values without departing from the present invention. Thus, a raw score may be an integer, a percentage, a rating, and a range without limitation. It may be appreciated that scoring may, in some embodiments, be inherently subjective. That is, in a comparison between a target source and a candidate, scoring may require subjective judgments to determine how desirable one attribute may be over another. In one example, structural similarity may be more or less desirable. In another example, contextual similarity may be more or less desirable. Thus, it may be noted that scoring does not necessarily imply an objective standard, although an objective standard may be utilized in embodiments described herein. In some instances, a rule may fail. Failure, in this example, may indicate a low score, or a complete non-match. In either case, a flag may be thrown in some embodiments to indicate a failed candidate. Threshold values for failure may be user defined or heuristically derived based on candidate selection history.

At a next step 308, the method applies a weighting to the score. As noted above, in some embodiments, weightings may be heuristically defined, statically pre-defined, or user defined. In a heuristically defined embodiment, an adaptive system may be configured to discover patterns in a user's final selection of candidates as offered by the table data match rules and to re-align future default selections in accordance with discovered patterns. Heuristic training, in this example selection process, could be viewed as an application of optimization theory and/or statistical estimation without departing from the present invention. Heuristic training, in some embodiments may be hidden to a user, with re-alignments of default selections made only when sufficient historical data is available for a given candidates scoring. At a next step, the method determines whether additional rules are available for processing. If the method determines at a step 310 that more match rules are available, the method continues to a step 304 to get a next match rule. If the method determines at a step 310 that no match rules are available, the method ends.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for matching a plurality of candidates with a target utilizing extract, transform and load (ETL) metadata utilizing a computer, the plurality of candidates originating from a plurality of secondary data sources, the method comprising:
    causing the computer to receive the target from a target data source;
    causing the computer to fetch the plurality of candidates from the plurality of secondary data sources;
    causing the computer to process each of a plurality of match rules, the plurality of match rules configured for determining whether ETL metadata corresponding with each of the plurality of candidates match with ETL metadata corresponding with the target, wherein the ETL metadata provides data for the processing;
    if the plurality of match rules determines a potential candidate match, causing the computer to provide a score for the potential candidate match utilizing a weighting method, the weighting method corresponding with a degree of importance of the match, wherein the score includes a plurality of raw scores adjusted by a predetermined weighting, wherein the score includes an aggregation of the plurality of raw scores each determined from the processed plurality of match rules, wherein a high score indicates a best match between the target and the potential candidate match, and wherein the potential candidate match corresponds with one of the plurality of candidates; and
    causing the computer to display the potential candidate match.

2. The method of claim 1, further comprising: causing the computer to select the potential candidate match for inclusion with the target data source, wherein the potential candidate match is at least partially appended to the target.

3. The method of claim 2, wherein the score is based on the weighting method selected from the group consisting of: a user defined weighting method, and a heuristically defined weighting method.

4. The method of claim 1, further comprising: causing the computer to exclude the potential candidate match from the target data source.

5. The method of claim 1, further comprising: if the plurality of match rules determines a non-match, eliminating any of the plurality of candidates corresponding with the non-match.

6. The method of claim 1, wherein the plurality of match rules are selected from the group consisting of: a table identity match comparison, a data domain match comparison, a column match comparison, a primary key match comparison, a foreign key match comparison, a semantic match comparison, a case independent match comparison, a partial string match comparison, and a fuzzy match comparison.

7. The method of claim 6, wherein the plurality of match rules are user selected.

8. The method of claim 1, wherein the target data source and the plurality of secondary data sources are associated with an access system selected from the group consisting of: relational databases, non-relational databases, flat files, Relational Database Management System (RDBMS), Information Management System (IMS), Virtual Storage Access Method (VSAM), Indexed Sequential Access Method (ISAM), ORACLE™ database, and DB2 database.

9. A computer program product matching a plurality of candidates objects with a target utilizing extract, transform and load (ETL) metadata, the plurality of candidates originating from a plurality of secondary data sources, the computer program product comprising:
    a non-transitory computer readable medium;
    first program instructions for receiving the target from a target data source;
    second program instructions for fetching the plurality of candidates from the plurality of secondary data sources;
    third program instructions for processing each of a plurality of match rules, the plurality of match rules configured for determining whether ETL metadata corresponding with each of the plurality of candidates match with ETL metadata corresponding with the target, wherein the ETL metadata provides data for the processing;
    if one of the plurality of match rules determines a match, fourth program instructions for providing a score for the potential candidate match utilizing a weighting method, the weighting method corresponding with a degree of importance of the match, wherein the score includes a plurality of raw scores adjusted by a predetermined weighting, wherein the score includes an aggregation of the plurality of raw scores each determined from the processed plurality of match rules, wherein a high score indicates a best match between the target and the potential candidate match, and wherein the potential candidate match corresponds with one of the plurality of candidates; and fifth program instructions for displaying the match, wherein the programmatic instructions are stored on the computer readable storage medium.

10. The computer program product of claim 9, further comprising: sixth program instructions for selecting the potential candidate match for inclusion with the target data source, wherein the potential candidate match is at least partially appended to the target.

11. The computer program product of claim 10, wherein the sixth program instructions for the scoring is based on the weighting method selected from the group consisting of: a user defined weighting method, and a heuristically defined weighting method.

12. The computer program product of claim 9, further comprising: seventh program instructions for excluding the potential candidate match from the target data source.

13. The computer program product of claim 9, further comprising: if one of the plurality of match rules determines a non-match, eighth program instructions for eliminating any of the plurality of candidates corresponding with the non-match.

14. The computer program product of claim 9, wherein the plurality of match rules are selected from the group consisting of: a table identity match comparison, a data domain match comparison, a column match comparison, a primary key match comparison, a foreign key match comparison, a semantic match comparison, a case independent match comparison, a partial string match comparison, and a fuzzy match comparison.

15. The computer program product of claim 14, wherein the plurality of match rules are user selected.

16. The computer program product of claim 14, wherein the weighting method is heuristically determined in accordance with a discovered pattern corresponding with results from the processing the plurality of match rules.

17. The computer program product of claim 9, wherein the target data source and the plurality of secondary data sources are associated with an access system selected from the group consisting of: relational databases, non-relational databases, flat files, Relational Database Management System (RDBMS), Information Management System (IMS), Virtual Storage Access Method (VSAM), Indexed Sequential Access Method (ISAM), ORACLE™ database, and DB2 database.

18. A method for matching a plurality of candidates objects with a target utilizing extract, transform and load (ETL) metadata, the plurality of candidates originating from a plurality of secondary data sources, the method comprising:
receiving the target from a target data source;
fetching the plurality of candidates from the plurality of secondary data sources;
processing each of a plurality of match rules, the plurality of match rules configured for determining whether ETL metadata corresponding with each of the plurality of candidates match with ETL metadata corresponding with the target, wherein the ETL metadata provides data for the processing;
if the plurality of match rules determines a potential candidate match, providing a score for the potential candidate match utilizing a weighting method, the weighting method corresponding with a degree of importance of the match, wherein the score includes a plurality of raw scores adjusted by a predetermined weighting, wherein the score includes an aggregation of the plurality of raw scores each determined from the processed plurality of match rules, wherein a high score indicates a best match between the target and the potential candidate match, and wherein the potential candidate match corresponds with one of the plurality of candidates and wherein the score is based on the weighting method selected from the group consisting of: a user defined weighting method, and a heuristically defined weighting method;
displaying the potential candidate match; and
selecting the potential candidate match for inclusion with the target data source, wherein the potential candidate match is at least partially appended to the target, wherein the plurality of match rules are selected from the group consisting of: a table identity match comparison, a data domain match comparison, a column match comparison, a primary key match comparison, a foreign key match comparison, a semantic match comparison, a case independent match comparison, a partial string match comparison, and a fuzzy match comparison.

19. The method of claim 18, further comprising:
if the plurality of match rules determines a non-match, eliminating any of the plurality of candidates corresponding with the non-match.

* * * * *